United States Patent [19]

Kenyon

[11] 3,727,452
[45] Apr. 17, 1973

[54] VAPOR GUARD VISCOMETER
[75] Inventor: Nazar P. Kenyon, Birmingham, Mich.
[73] Assignee: Parke, Davis & Company, Detroit, Mich.
[22] Filed: Aug. 5, 1971
[21] Appl. No.: 169,309

[52] U.S. Cl. ...................................................73/59
[51] Int. Cl. ............................................G01n 11/14
[58] Field of Search.........................................73/59

[56] References Cited

UNITED STATES PATENTS

| | | |
|---|---|---|
| 2,957,339 | 10/1960 | Penny et al..............................73/59 |
| 1,836,995 | 12/1931 | Stickney..................................73/59 |
| 2,142,854 | 1/1939 | La Pierre.................................73/59 |

Primary Examiner—Richard C. Queisser
Assistant Examiner—Joseph W. Roskos
Attorney—Robert R. Adams et al.

[57] ABSTRACT

Viscometer means are provided for monitoring, over extended periods, the viscosity of pharmaceutical capsule dipping solutions and the like, particularly solutions being mixed under exposure to air. The apparatus includes a rotational viscometer and viscometer spindle having guard means affording non-turbulent exposure to the moving liquid and protection for critical shear surfaces.

6 Claims, 3 Drawing Figures

PATENTED APR 17 1973   3,727,452

INVENTOR.
NAZAR P. KENYON
BY David B. Ehrlinger
ATTY.

VAPOR GUARD VISCOMETER

SUMMARY AND DETAILED DESCRIPTION

This invention relates to novel apparatus and means for measuring viscosity of pharmaceutical capsule dipping solutions and the like. More particularly, the invention concerns improved rotational viscometer means of the suspended spindle type.

Heretofore the art has commonly employed viscometer means having a rotational viscometer spindle which for some applications may be operated within a protecting tubular spindle guard. The prior art apparatus, however, has been limited in its application and is inadequate, for example, where there is varying exposure from run to run to secondary or extraneous shear surfaces or where the apparent viscosity over a period of time progressively increases due to local congealing or thickening, etc.

It is therefore an object of the present invention to provide improved apparatus and means for measuring the viscosity of pharmaceutical capsule dipping solution and the like and also for measuring the same on a continuous basis.

It is another object to provide means for measuring the viscosity of liquids which have an inherent tendency to congeal and thicken over a period of time.

It is also an object of the invention to provide means in measuring the viscosity of liquids for maintaining uniform exposure to critical shear surfaces from run to run.

Figure 1:
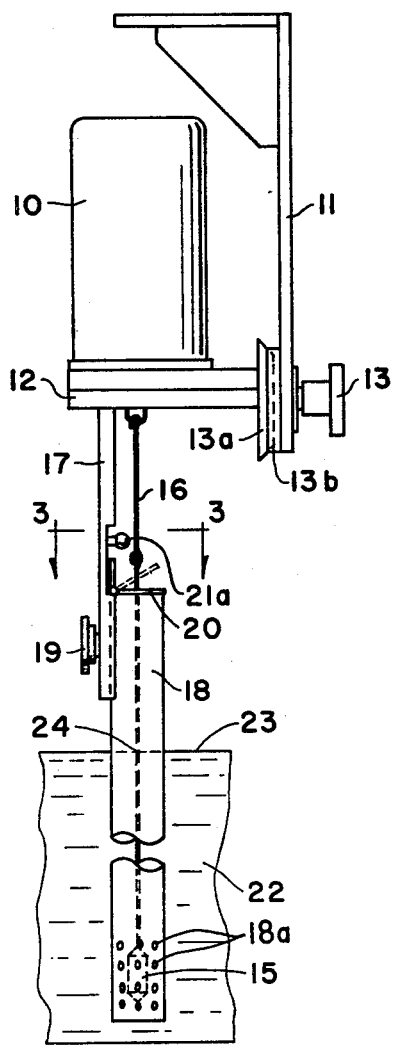
Figure 2:
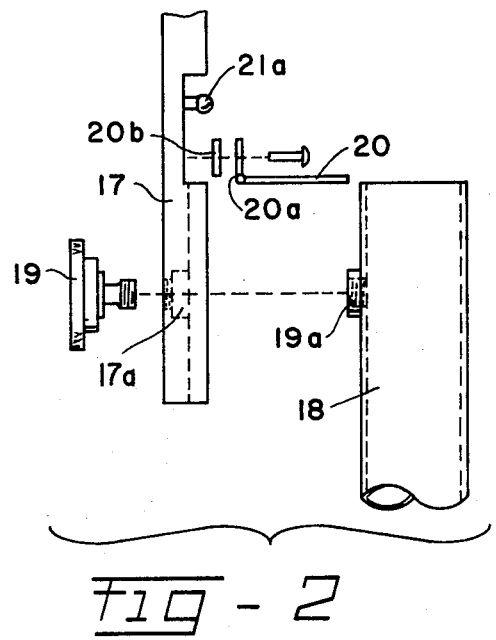
Figure 3:
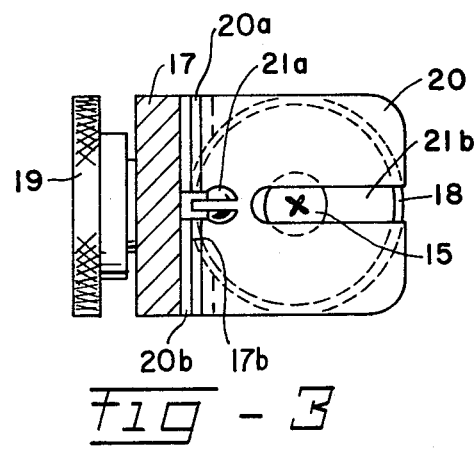

These and other objects, purposes and advantages of the invention will be seen from the following description with reference to the accompanying drawing in which FIG. 1 is a view in elevation of a preferred viscometer and spindle tube according to the invention;

FIG. 2 is a side view in assembly showing means securing the tube to the viscometer mounting; and FIG. 3 is a top view taken on line 3—3 of FIG. 1.

Referring to the drawing, FIG. 1 illustrates a preferred embodiment in which a viscometer 10 is arranged for measuring the viscosity of a liquid 22 being cycled or mixed in a container such as the reservoir of a capsule dipping tank. The viscometer is mounted from a stationary bracket assembly 11 holding a leveling mount 12 which is mechanically adjustable to a level position by means of the adjustment screw 13, universal disc 13a, and socket 13b. A spindle 15 is suspended from the viscometer 10 by plumb line or spindle extension line 16. Extending downward at right angles from the leveling mount 12 is a mounting bracket 17 on which a spindle guard tube 18 is detachably mounted. The guard tube is generally cylindrical, open at both ends and conveniently made of a durable inert metal, preferably stainless steel polished for ease in cleaning. The lower end of the tube in the area adjoining the spindle 15 is provided with vent holes 18a, preferably evenly located in both axial and radial position with respect to the spindle position, the object being to balance the geometry of the shear surfaces particularly as between the spindle and the guard tube.

For mounting, hub 19a of the tube is inserted into recess 17a which serves to locate the tube within an axial channel 17b, thus assuring correct vertical alignment. The hub in turn is locked in position by the mounting screw 19. By these means the tube from time to time can be detached as required for cleaning purposes, etc., and remounted each time precisely in the same position relative to the spindle 15 and spindle line 16.

According to a preferred embodiment of the invention, the upper end of the tube which is open to the atmosphere is provided with a cover 20 hingeably mounted to the bracket 17 by mounting piece 20a and spacer 20b. The cover 20 serves to close the open end of the tube (FIG. 3) surrounding and spaced from the plumb line at the liquid interface and for a sufficient distance above the liquid, and thereby provides a confined zone inside the tube such that vapor given off from the liquid surface within the zone is substantially completely retained within the zone and is in equilibrium with the liquid surface; it also can be tilted upward by hinge means to the open position illustrated in dotted outline, FIG. 1. To secure the cover 20 in open position for cleaning purposes, etc., a cover lock 21a is provided. The cover 20 has a slotted opening 21b slightly narrower than the width of the cover lock 21a so that as the cover is swung open to the full position it compresses the cover lock and snaps onto it. The lock advantageously holds the cover away from the rotation axis, as appears below, for changeover purposes etc.

OPERATION

In operation the viscometer 10 mounted above the body of liquid 22 on bracket 11 is adjusted to a level position, as illustrated, by adjustment of screw 13, leveling socket 13a and disc 13b. Next, the spindle guard 18 is mounted in position (with the lower end immersed in the liquid) and secured on a vertical line within channel 17b by tightening the mounting screw 19. The cover 20 is snapped into the fully open position by advancing the same past cover lock 21a. The spindle 15 is then lowered on line 16 into the tube to the position illustrated and the line is attached to the mounting below the viscometer 10. Finally, the upper end of the tube is closed by means of the hinged cover, and the spindle is set in rotation at the operating speed. For cleaning purposes the operation is reversed.

For the production of pharmaceutical capsules by the mold dipping technique, it is important as indicated to maintain constant control of the viscosity of the dipping solution. Attempts in this regard using rotational viscometric means (for measuring the shear forces or tangential drag on the spindle) have in the past been unsatisfactory particularly for continuous measurement and over long periods of time. The problem is complicated by the fact that the viscosity of the dipping solution (usually aqueous gelatin) tends to vary at different locations in the dipping tank for various reasons such as incomplete mixing, local differences in temperature (the operating temperature being, for example, from 105°–125° F. and preferably from 110°–115° F.), evaporation loss, etc. Surface drag is another problem due to progressive thickening of the dipping solution whereby viscosity measurement satisfactory at the start of the run becomes faulty or inaccurate in periods as short as 15 minutes. Also, while it is considered important for measurement purposes to maintain flow of the dipping solution to the spindle, there is a tendency for such flow to deflect the spindle and cause it to swing (that is, to undergo a pendulum action) in which case, accurate measurement becomes impossible. Also, change in the location of the spindle in the liquid relative to the surrounding wall surfaces has an appreciable effect on the net rate of shear being measured.

In contrast to the prior art means, the above-described apparatus of the invention, particularly when used for measuring the viscosity of the dipping solution for pharmaceutical capsule production over extended periods of time, up to 18 hours or more, has been completely satisfactory. The apparatus advantageously serves to eliminate undesirable adverse influences which interfere with accurate measurement of the viscosity, that is with measurement of the change in the shear rate due to the viscous change in the liquid itself. In particular, the spindle guard tube 18 protects the spindle and plumb line against interfering shear surfaces and assists in maintaining the dipping solution homogeneous throughout the confined zone with respect to viscosity and temperature, especially on the liquid surface 23 at point 24 where the plumb line is exposed to both air and liquid. The vent holes 18a serve to promote lateral (as opposed to vertical) circulation of the dipping solution at the surface of the spindle, i.e., the flow is adequate to insure constant change at the spindle surface such that the sample being measured is truly representative of the average liquid viscosity in the dipping tank. While the vent holes do provide for the desired flow, yet the venting effect is not excessive to the point that the spindle swings or undergoes a pendulum action. For purposes of illustration, a preferred venting configuration for a guard tube (1½ inch O.D. 16 gauge 316 stainless tubing) is 5 rows of holes (⅛ inch in diameter) per row with ½ inch axial space between rows and 45° radial space between holes.

The apparatus of the invention is particularly well-adapted for viscosity measurement of aqueous gelatin solutions but it will be realized that the invention can be used for solutions other than gelatin solutions, and in fact for liquid viscometry in general.

For preferred purposes in capsule production the apparatus is used with forced flow dipping tanks of conventional design. For this application, the guard tube 18 is preferably located for free access, ordinarily in one of the open corners of the tank isolated from competing shear surfaces. Also, the tube should be located in precisely the same position from run to run, as indicated, to assure that the measurement each time will be reproducible.

While the invention in viscometer means has been described in considerable detail in the foregoing specification, it will be realized by those skilled in the art that wide variation can be made in such detail within the spirit of the invention claimed below. It is intended that the claims which follow be interpreted to cover both the invention particularly described and any such variation.

I claim:

1. In viscometer apparatus comprising a spindle adapted to be held suspended on a torsion-transmitting plumb line for immersion in a flowing body of congealable aqueous liquid and for rotation therein at a rate proportional to the viscosity of the liquid, the spindle being shielded in its rotation by a surrounding spindle guard tube having open upper and lower ends, the improvement comprising a bracket having means for removably mounting the spindle guard tube, a cover for the upper end of the guard tube adapted to provide a confined zone inside the tube such that vapor given off from the liquid surface within the zone is substantially completely retained within the zone and is in equilibrium with the liquid phase.

2. Apparatus according to claim 1 wherein the spindle guard is a tube apertured for liquid flow relative to the spindle at a rate such that the spindle is maintained substantially free of lateral motion relative to the spindle guard.

3. Apparatus according to claim 1 wherein the cover for the spindle guard tube is hingeably mounted on the bracket.

4. Apparatus according to claim 2 wherein the liquid is aqueous gelatin solution.

5. Apparatus according to claim 3 wherein the liquid is aqueous gelatin solution.

6. Apparatus according to claim 2 including means for detachably mounting the spindle guard in a capsule dipping tank.

* * * * *